United States Patent
Mehta et al.

(10) Patent No.: US 10,140,164 B2
(45) Date of Patent: Nov. 27, 2018

(54) COMPUTER RESOURCE ALLOCATION TO WORKLOADS IN AN INFORMATION TECHNOLOGY ENVIRONMENT

(71) Applicant: Accenture Global Solutions Limited, Dublin (IE)

(72) Inventors: Kunal Mehta, Minneapolis, MN (US); David M. Klimek, North Bethesda, MD (US); Farah Lalani, Toronto (CA); Justin Melde, Seattle, WA (US); Kate Wilson, Seattle, WA (US); Brian Svehaug, Seattle, WA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 184 days.

(21) Appl. No.: 15/218,386

(22) Filed: Jul. 25, 2016

(65) Prior Publication Data
US 2018/0024868 A1    Jan. 25, 2018

(51) Int. Cl.
*G06F 9/50* (2006.01)
*G06F 17/30* (2006.01)

(52) U.S. Cl.
CPC ........ *G06F 9/5083* (2013.01); *G06F 17/3053* (2013.01); *G06F 17/30519* (2013.01); *G06F 17/30592* (2013.01); *G06F 17/30598* (2013.01)

(58) Field of Classification Search
None
See application file for complete search history.

(56) References Cited

U.S. PATENT DOCUMENTS

| | | | |
|---|---|---|---|
| 5,745,652 A | 4/1998 | Bigus | |
| 9,325,585 B1 | 4/2016 | Wang et al. | |
| 2007/0266145 A1* | 11/2007 | Nesbitt | G06F 17/3089 709/224 |
| 2013/0080761 A1* | 3/2013 | Garrett | G06F 11/3414 713/100 |
| 2013/0247061 A1* | 9/2013 | Kiehn | G06F 9/5044 718/104 |
| 2015/0161385 A1* | 6/2015 | Gounares | G06F 21/54 726/25 |
| 2015/0206203 A1* | 7/2015 | Tietzen | G06Q 30/0279 705/14.3 |
| 2016/0154660 A1* | 6/2016 | Clark | G06F 9/45558 718/1 |
| 2017/0097841 A1* | 4/2017 | Chang | G06F 9/45558 |
| 2018/0018569 A1* | 1/2018 | Roitman | G06N 5/04 |

FOREIGN PATENT DOCUMENTS

WO    2015/179778 A1    11/2015

* cited by examiner

*Primary Examiner* — Wynuel S Aquino
(74) *Attorney, Agent, or Firm* — Mannava & Kang, P.C.

(57) ABSTRACT

According to an example of the present disclosure, an information technology (IT) environment, such as a data center, a cloud services platform or other type of computing environment, may include computer resources that are dynamically allocated to workloads. A model is generated to estimate performance and allocate computer resources to the workloads.

15 Claims, 13 Drawing Sheets

COMPUTER RESOURCE ALLOCATION TO WORKLOADS IN AN INFORMATION TECHNOLOGY ENVIRONMENT

BACKGROUND

Despite advances in data center technologies and management approaches, many organizations struggle to create an optimized information technology service environment. The proliferation of data to be managed may cause an organization to provision more storage, server and database solutions. Yet, this may lead to unnecessary overprovisioning of resources that may ultimately result in resources being unused for extended periods of time.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
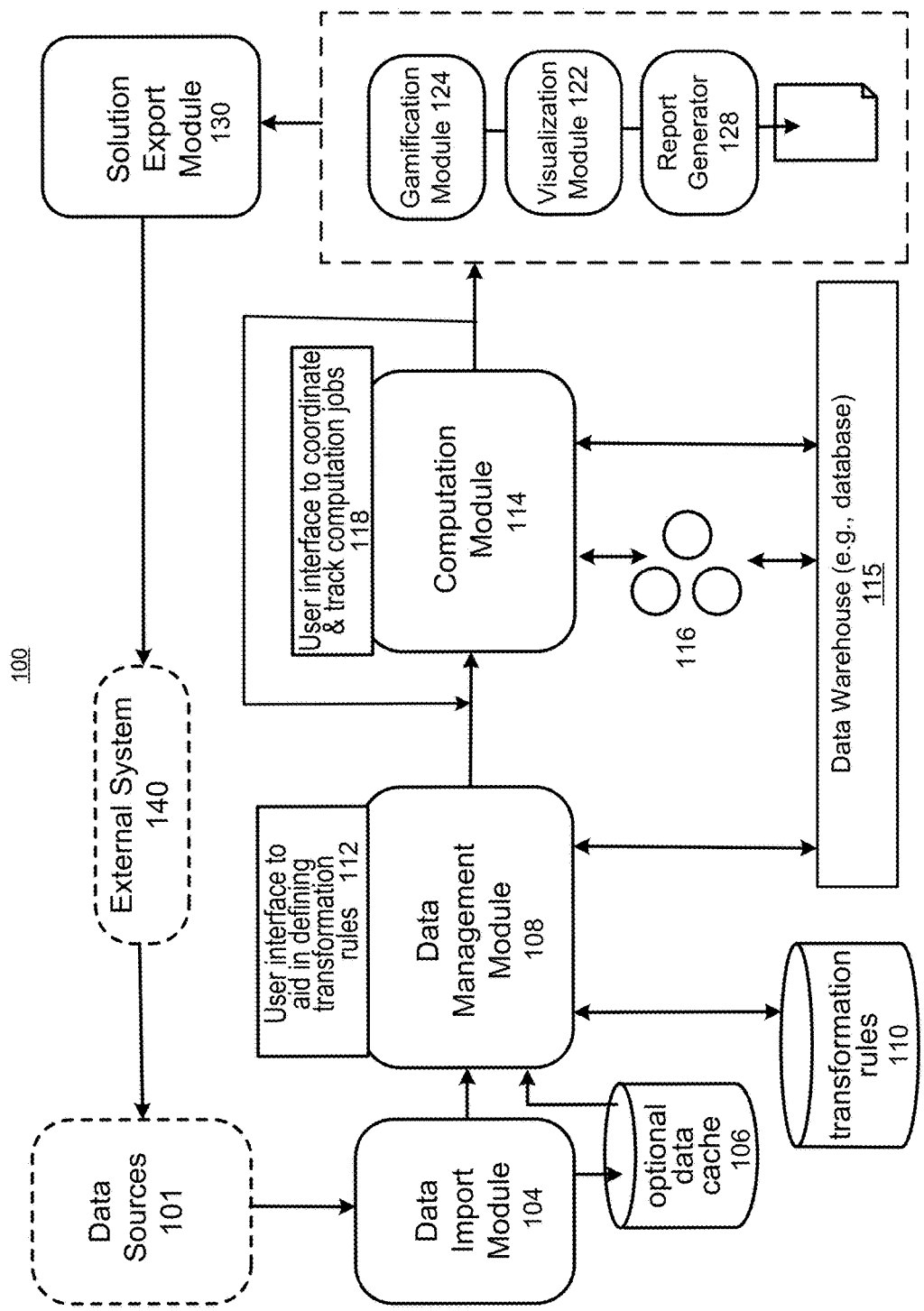
FIG. 1 shows a system diagram, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an example of the present disclosure, an information technology (IT) environment, such as a data center, a cloud services platform or other type of computing environment, may include computer resources that are dynamically allocated to workloads. A workload may include an amount of work performed by an entity in a given period of time, or the average amount of work handled by an entity at a particular instant of time. The entity may include computer resources, such as servers, memory, databases, network devices, etc. One approach to boosting workload capabilities is to increase the number of servers and run applications on different servers.

Some examples of different types of workloads are now described. Memory workload is the capability of memory to store temporary or permanent data. The memory workload may include the memory use over a given period of time or at a specific instant in time. Paging and segmentation activities use a lot of virtual memory, thereby increasing the use of main memory. However, when the number of programs being executed becomes so large that memory becomes a bottleneck for performance, it indicates more memory is needed or programs need to be managed in a more effective manner. Another type of workload is central processing unit (CPU) workload which may relate to the number of instructions being executed by the processor during a given period or at a particular instant of time. This statistic indicates a need for an increase in processing power if the CPU is overloaded all the time, or a decrease in processing power if CPU use falls below a certain threshold. Input/Output (I/O) workload relates to the number of inputs gathered by a system and the number of outputs produced by a system over a particular duration of time is termed as input-output workload. Database workloads may relate to memory and storage use and query execution, such as the number of queries executed by the database in a given period of time, or the average number of queries being executed at a particular instant of time.

The performance of computer resources running workloads is measured by through various metrics including speed of servers, quality of connection, as well as cost metrics. According to an example of the present disclosure a model is generated and used to predict performance based on metrics. The model is dynamic and weightings for different metrics in the model may be changed. Based on the model's predictions, computer resources may be allocated to workloads. The model may be able to provide a score to gauge how well it is serving the organization's customers and provide insights on modifying resource utilization, areas where performance could be improved, etc., in order to improve the overall functioning of the IT environment.

As indicated above, an adaptive model may be generated to predict performance based on metrics. Extract, transform and load operations may be performed to capture and store data for the metrics from a plurality of different data sources. One or more metrics may also be measured through machine learning. A model may be generated based on determined importance of metrics. The model may be used to predict performance and determine actionable insights to rectify performance issues estimated from the predicted performance. The model may be modified over time to align with client goals. In another example, the model may be used to predict performance of agents, such as call center agents. The model may be used in other environments as well. The model may also be tuned based on feedback determined from external systems. Also, the model may be tuned to be customer centric, such as to measure the performance of an agent based on customer experience or other goals of an organization or company.

The predicted performance may be provided as a score. For example, a single score may be generated as a performance prediction even though many different metrics may be considered to calculate the score according to the model. Also, a gamification subsystem and process may be generated based on the scores to create an environment that nurtures performance improvement.

FIG. 1 shows a diagram of a system 100, according to an example of the present disclosure. The system 100 in FIG. 1 may be implemented in a distributed manner across multiple computers and systems, or some (or all) components may be implemented on the same computer. Components on separate computers may use any suitable communications technique to transmit data (represented by the arrows) between one another. For example, in an implementation, the system 100 may be implemented as a distributed computing platform that coordinates the extraction of data sets for a large numbers of metrics from a plurality of data sources and stores the data sets in a data warehouse. The data from the data warehouse may be retrieved to generate and modify models for predictive analytics and scoring.

In the example of FIG. 1, data may be accessed from data sources 102 by data import module 104. The data import module 104 may optionally store some or all (or none) of the data in a local data cache 106. The imported data may then be passed to a data management module 108 for processing. For example, the data management module 108 may organize the data by grouping, ordering, transforming, and/or "cleaning" the data, for example, in such a way that facilitates model generation and model tuning, and facilitates creation of data sets for machine learning classification. The data management module 108 may use one or more transformation rules that specify one or more transformations to apply to the data for processing. In some implementations, the transformation rules may be accessed from storage. Additionally or alternatively, the transformation rules may be input by a user. For example, the data management module 108 may provide a user interface 112 to a user that enables the user to specify one or more transformation rules.

The data management module 108 may identify different types of metrics, one or more of which may be specified by a user. The metrics determined by the data management module 108 are provided to the computation module 114. The computation module 114 may generate a model (e.g., model 310 shown in FIG. 3) to predict performance based on the metrics. The performance, for example, may be for an agent or a computer or for a system. In an example, the system 100 may predict performance for an Information Technology (IT) environment. In another example, the system 100 may predict performance for an agent, which may be a human that is assigned to perform particular tasks or job functions. The computation module 114 may also apply one or more generalized heuristic supervised machine learning functions to the computation process to determine inputs for model computations. Also, computational nodes 116 may provide a distributed computing platform for operations performed by the computation module 114.

The computation module 114 may also provide a graphical user interface. The graphical user interface may include visualization module 122 which shows scores, predictive insights, agent-level reporting, and other reports and information. A report generator 128 may generate customized reports regarding the modeling, scoring and predictive insights.

In some implementations, the visualization module 122 may also provide the modeling, scoring and predictive insight outputs to a solution export module 130. The solution export module 130 may then provide feedback information to external systems 140. For example, the solution export module 130 may provide feedback information to an external rules engine, which may, for example, use the feedback information for control systems.

In an IT environment, the external system may include computer resource scheduling and provisioning systems that facilitate allocation of computer resources to execute computing jobs, such as to satisfy service level agreements. The external systems 140 may be connected to or be part of one or more of the data sources 101. Also, one or more of the outputs of the computational module 114, which may include performance predictions (e.g., scores) may be used as input for operations performed by the computation module 114.

In an example, the system 100 can automatically integrate into external systems 140 or gamification module 124 to provide targeted, insightful and real-time control over other parts of the customer service organization and the employee experience. For example, an automated trigger can be set up so that agents that receive a score that is in the top x % of their peer group receive various rewards/recognition based on integration between the output and a performance management system. This automated feed to rewards and recognition is a novel, technology-based integration that can result in more engaged employee base. In addition to integrating output for management of rewards and recognition, the model output can also be integrated into the Agent Desktop/Customer Relationship Management (CRM) system in order to provide automated notifications and coaching tips. For example, if an agent's score has recently been dipping due to low customer feedback, a message is generated on the agents CRM to remind the agent to ask the customer for feedback: "Did you remember to ask the customer to provide feedback?". Depending on how the agent's score is changing and what individual components are driving that change, the messaging/coaching tips would be automatically adjusted so that it is tailored to that specific ambassador's performance.

Another application of the model output is to drive product improvements; for example, if scores are low due to negative sentiment on tickets associated with certain products, feedback can automatically be sent to the appropriate product development/engineering team so that any product bugs/issues can immediately be addressed and tied back to the overall success of the customer service organization.

The system 100 may also include a gamification module 124. The gamification module 124 may be programmed to execute competitions and generate visualizations, such as a leader board, based on the competitions and the predicted performance determined by the computation module 114. For example, if the system 100 is implemented to predict performance for call service agents, the gamification module 124 may generate a leader board of the predict performances for the call service agents and implement incentives to reach the top of the leaderboard.

FIG. 1 also shows a data warehouse 115, which may include a database or another type of storage system. The data warehouse 115 may store metrics from the data sources 101, outputs of the computation module 114 or any data or information generated or used by the system 100.

One or more of the components of the system 100 may be embodied as software comprised of machine readable instructions that may be stored on a non-transitory computer readable medium and executed by at least one hardware processor. For example, one or more of components 104, 108, 114, 122, 124, 128 and 130 may be comprise software that is executed by at least one hardware processor to perform the functions of these components.

Figure 2A:
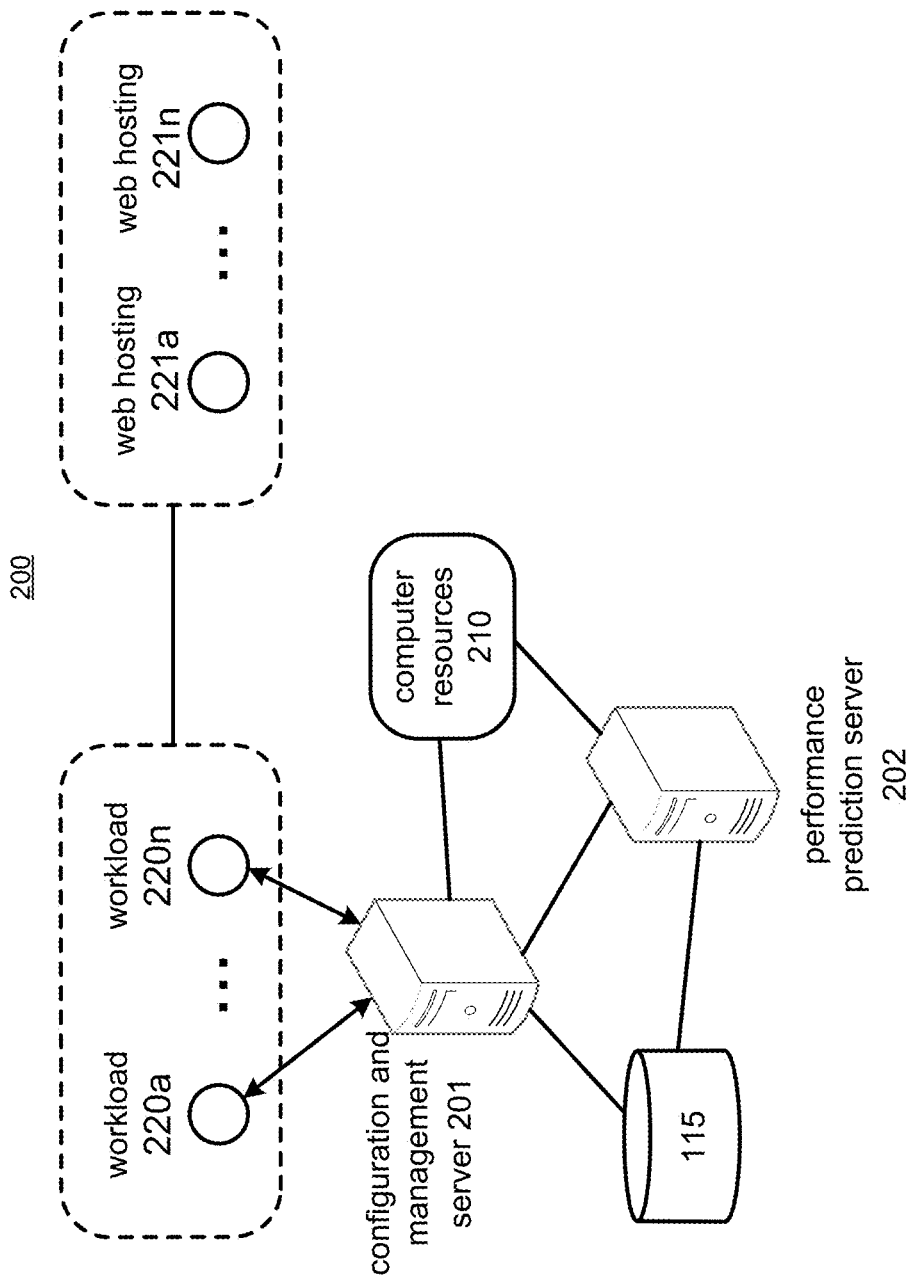
FIG. 2A shows an information technology environment, according to an example of the present disclosure.

FIG. 2A shows an example of an IT system 200 that incorporates the system 100. The IT system 200 includes at least one configuration and management server 201 to capture data from computer resources 210 in a network. Computer resources 210 may include devices, network appliances, servers, other types of computer systems, virtual machines, network devices that enable network connectivity over a data communication network or any device or software that may be managed to provide services over a network. In an example, the configuration and management server 201 may manage the computer resources 210 as one or more pools of computer resources, and can provision computer resources as needed to accommodate fungible workloads. The configuration and management server 201 may perform computer resource scheduling and provisioning operations that facilitate allocation of computer resources to execute computing jobs, such as to satisfy service level agreements.

The IT system 200 also includes performance prediction server 202 that predicts performance of computer resources from the computer resources 210 that may execute workloads. The IT system 200 may operate in a data center or other environments. The performance prediction server 202 may include components of the system 100, such as components 104, 108, 114, 122, 124, and 128 which may be comprised of software (e.g., machine readable instructions) that is executed by at least one hardware processor of the performance prediction server 202 to perform the functions of these components.

For example, the data management module 108 may identify performance metrics of the computer resources 210 to capture and store in the data warehouse 115. One or more of the performance metrics may be specified by a user. In an example, centralized monitoring and management software that is currently available, such as from HEWLETT-PACKARD, IBM, etc., may be used to measure, store and analyze the performance metrics for the computer resources 210. The performance prediction server 202 may execute the computation module 114 shown in FIG. 1 to generate a model to predict performance of the computer resources 210 based on the captured performance metrics. The performance prediction server 202 may determine predictions from the performance metrics according to the model, and the configuration and management server 201 may use the predictions to determine computer resource allocation and provisioning for workloads. FIG. 2A shows the configuration and management server 201 connected to workloads 220a-n where n is an integer greater than 1. This is meant to illustrate that the configuration and management server 201 may can dynamically allocate and provision computer resources from the computer resources 210 to the workloads 220a-n depending on the varying computer resource demands of the workloads 220a-n. The computer resources may be allocated based on the model's scoring and predictions.

In an example shown in FIG. 2A, the workloads 220a-n comprise web hosting services 221a-n. The web hosting services 221a-n are provided by computer resources allocated from the computer resources 210. The web hosting services 221a-n may include hosting web sites accessible to end users via the Internet and may range in complexity from web sites that are primarily directed to providing information, such as blogs, to interactive web sites that may provide online shopping directed to millions of end users. The web hosting services 221a-n may have varying demands, and the configuration and management server 201 may allocate the computer resources 210 to the web hosting services 221a-n as needed to accommodate the varying demands.

Performance metrics are determined for the web hosting services. One or more of the performance metrics may be user-facing to evaluate the experience of the end user visiting the web site. Some examples of categories of performance metrics that may be measured and stored may include: metrics approximating the end-to-end response time observed by the client for a web page download, which may include a breakdown between server processing and networking portions of overall response time; metrics evaluating the caching efficiency for a given web page by computing the server file hit ratio and server byte hit ratio for the web page; and metrics relating the end-to-end performance of aborted web pages to the quality of service (QoS). Some examples of metrics approximating the end-to-end response time may include time when the first synchronization (SYN) packet from the client is received for establishing a connection; time when the first byte of a request is received; time when the last byte of the request is received; time when the first byte of the response is sent; time when the last byte of the response is sent; time when the acknowledgment (ACK) for the last byte of the response is received, etc.

As indicated above, the performance metrics may include metrics related to caching efficiency for a web page. For example, response times of a web hosting service may be improved from the presence of caches, which may be provided in the network or browser. Ratios related to cache hits versus server hits for web objects or web pages may be used to measure cache performance or caching efficiency. User-perceived QoS may also be measured, for example, in terms of frequency of aborted connections or other metrics related to aborted delivery of web pages.

The performance prediction server 202 may build a model from the performance metrics. Examples of generating a model based on metrics are further described below and are applicable to the performance metrics selected and captured for the computer resources 210. The model may also be tuned based on feedback. As discussed above, in an example, the performance metrics may be user-facing to evaluate the experience of the user of the web hosting services fee, and the feedback may be based on user evaluations of the web hosting services. Also, performance metrics and feedback may be determined based on service level agreements that may specify levels for one or more performance metrics that must be achieved by the service provider providing the web hosting services using the computer resources 210. For example, a minimum response time may be specified. In an example, tuning the model based on feedback may include modifying weights for one or more performance metrics in the model based on the feedback.

According to an example, the output of the model may include a single score for each web hosting service provided by the computer resources 210. Also, the model may be tuned to be end user centric, such as to measure the performance of a web hosting based on end user experience or maybe tuned according to other goals, such as based on service level agreement metrics and goals. The selected metrics for the model may include metrics from the point of view of the customer which reflect the experience of the end user. In this example, the predicted performance may include the score. For example, the single score may be determined from the model even though many different metrics may be considered to calculate the score according to the model. In an example, the model may include factors comprised of categories of metrics. Examples of categories are discussed above, such as response time observed by the client (e.g., end user), caching efficiency, and aborted requests. The model may include one or metrics under each category. If the score determined by the model falls below a threshold, then each of the categories of metrics may be evaluated to determine whether a particular category is under performing. If a particular category is under performing, then individual metrics within the category are further evaluated to determine whether they are under performing. Based on an underperforming category or an underperforming metric, different actions may be taken. The actions may include provisioning particular computer resources for the web hosting service to improve an underperforming category or an underperforming metric. For example, remedial measures may be taken to provision additional data storage for caching, or to provision additional CPU cycles or additional virtual machines to improve response times. In another example, additional network switches or network switches that have higher throughput capability may be provisioned to minimize aborted requests for web pages.

Figure 2B:
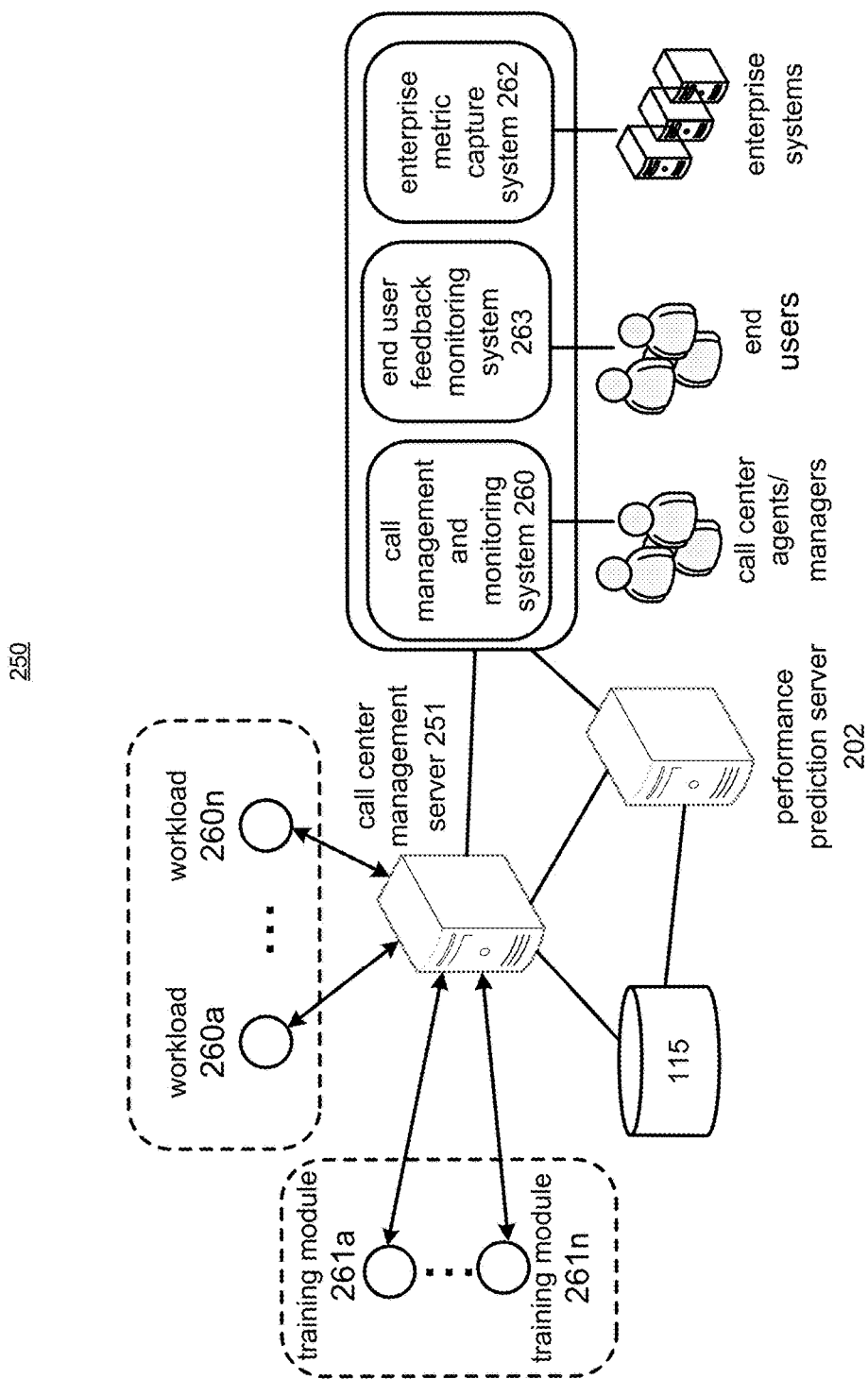
FIG. 2B shows another environment, according to an example of the present disclosure.

FIG. 2B shows an example of a call center management system 250 that incorporates the system 100. The call center management system 250 includes at least one call center management server 251. The call center management server 251 may manage call center services. The call center management server 251 may include call management and monitoring system 260 to perform the call management operations. Examples of the operations may include call logging, call recording, call routing, call scripting, agent workload assignment, agent training, etc. Furthermore, the system 260 captures metrics related to performance of the call center agents that are making the calls or taking the calls. Examples of the performance metrics may include number of agents logged in, number of calls that exceed a threshold, e.g., 5 minutes, numbers of calls answered per day by each agent, average call length, etc. The performance metrics may be stored in the data warehouse 115.

The call center management server 251 may also include an end user feedback monitoring system 263 to capture feedback of end users. The end users may be people that call the call center to resolve a problem. In an example, the end user feedback monitoring system 263 may send requests to the end users complete online surveys, and generate the online surveys so the end users can provide feedback regarding satisfaction of the service provided by an agent. The information provided by the end users in the surveys, which may be related to direct feedback from end users regarding customer satisfaction may also be stored in the data warehouse 115 as additional metrics to evaluate the agents. Furthermore, managers may provide feedback through the system 263 regarding agent performance which may also be stored in the data warehouse 115 as additional metrics to evaluate the agents.

The call center management server 251 may also include an enterprise metric capture system 262 that can connect to enterprise systems that track cost, revenue and other factors related to performance. Metrics determined from the enterprise metric capture system 262 may be stored in the data warehouse 115.

The performance prediction server 202 may include components of the system 100, such as components 104, 108, 114, 122, 124, and 128 which may be comprised of software that is executed by at least one hardware processor of the performance prediction server 202 to perform the functions of these components. For example, the data management module 108 may identify performance metrics to capture and store in the data warehouse 115 and evaluate. One or more of the performance metrics may be specified by a user. The performance prediction server 202 may execute the computation module 114 shown in FIG. 1 to generate a model to predict performance of each of the agents based on the captured performance metrics.

The performance prediction server 202 may determine predictions for the performance metrics according to the model, and the may use the predictions to determine workloads for the agents. FIG. 2B shows the call center management server 251 allocated workloads 260*a-n* to agents. The workloads 260*a-n* may include calls to be answered by each agent. Agents with better performance as determined according to the output of the model may be assigned a larger number of calls per day.

The call center management server 251 may also schedule and execute training for agents based on the predictions determined according to the model. For example, if an agent's score is below a threshold, the metrics are analyzed to determine whether any are underperforming and are associated with available training modules 161*a-n*. The training modules 161*a-n* may include online training that can be viewed by an agent via their workstation or a computer or smartphone.

Figure 2C:
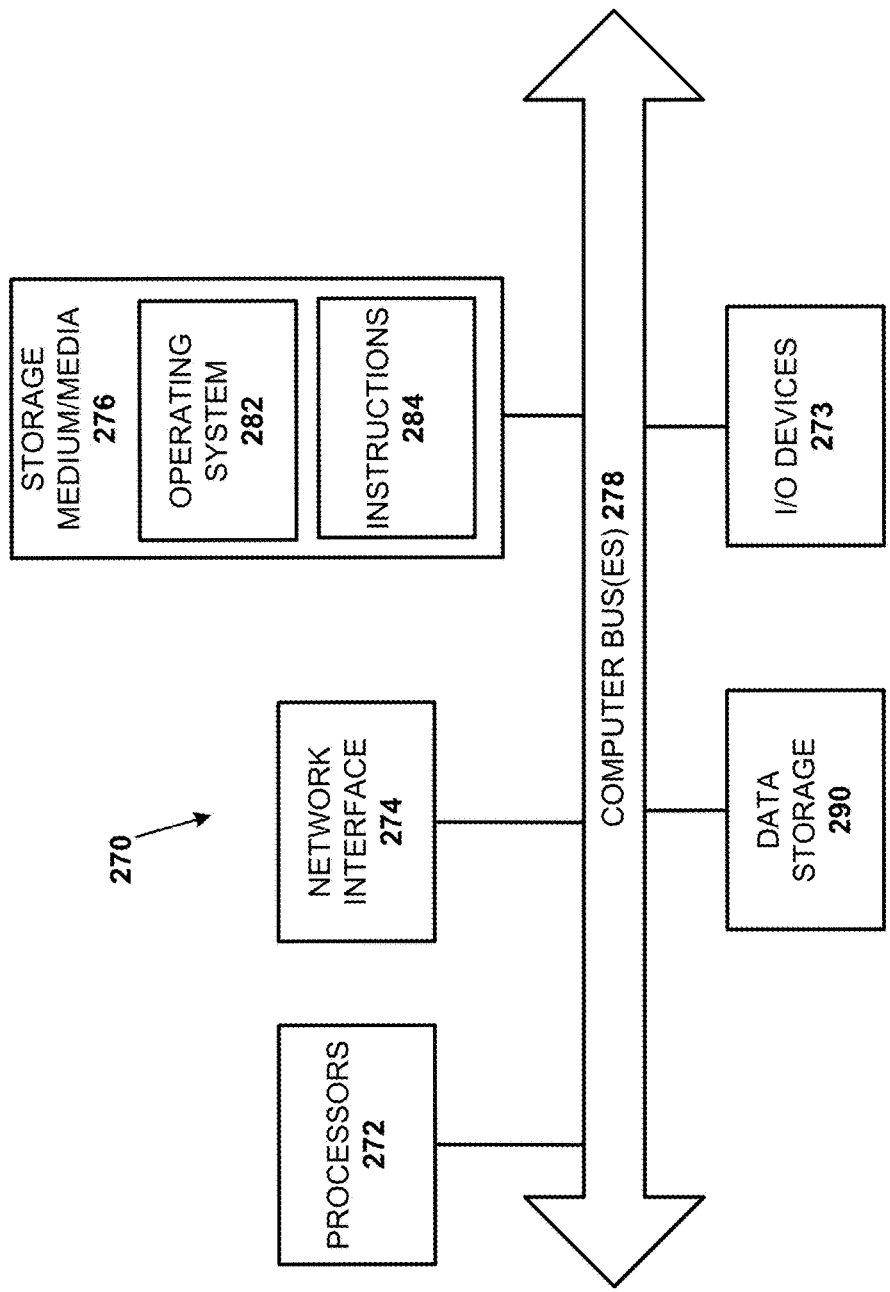
FIG. 2C shows a computing platform, according to an example of the present disclosure.

FIG. 2C shows a block diagram of a computing platform 270 that may be used for one or more of the components of the system 100. The computing platform 270 may include additional components not shown and that some of the components described may be removed and/or modified. The computing platform 270 includes computer hardware that may execute machine readable instructions as described below. The computing platform 270 may be part of a distributed computing platform. The computing platform 270 may include a platform for any of the servers shown in FIGS. 2B-C.

The computing platform 270 includes processor(s) 272, such as a central processing unit, ASIC or other type of processing circuit, input/output devices 273, such as a display, mouse keyboard, etc., a network interface 274, such as a Local Area Network (LAN), a wireless 802.11x LAN, a 3G or 4G mobile WAN or a WiMax WAN, and a computer-readable medium 276. Each of these components may be operatively coupled to a bus 278. The computer readable medium 276 may be any suitable medium which participates in providing instructions to the processor(s) 272 for execution. For example, the computer readable medium 276 may be non-transitory or non-volatile medium, such as a magnetic disk or solid-state non-volatile memory or volatile medium such as RAM. The instructions or modules stored on the computer readable medium 276 may include machine readable instructions 284 executed by the processor(s) 272 to perform the methods and functions of the system 100.

Modules and other components of the system 100 may be implemented as software stored on a non-transitory computer readable medium and executed by one or more processors. For example, the computer readable medium 276 may store an operating system 282, such as MAC OS, MS WINDOWS, UNIX, or LINUX, and machine readable instructions 284 that are executable to perform the operations of the system 100. The operating system 282 may be multi-user, multiprocessing, multitasking, multithreading, real-time and the like. For example, during runtime, the operating system 282 is running and the machine readable instructions 284 are executed by the processor(s) 272.

The computing platform 270 may include a data storage 290, which may include non-volatile data storage (e.g., non-transitory computer readable medium). The data storage 290 stores any data used by the system 100.

The network interface 274 connects the computing platform 270 to internal systems for example, via a network. Also, the network interface 274 may connect the computing platform 270 to the Internet. For example, the computing platform 270 may connect to web browsers and other external applications and systems via the network interface 274. The network interface 274 may connect to any suitable network, such as local area networks (LANs) and wide area networks (WANs), such as the Internet. The network may include signal bearing mediums that may be controlled by software, applications and/or logic. The network may include a combination of network elements to support data communication services. The network may encompass wired and/or wireless network technologies.

Figure 3:
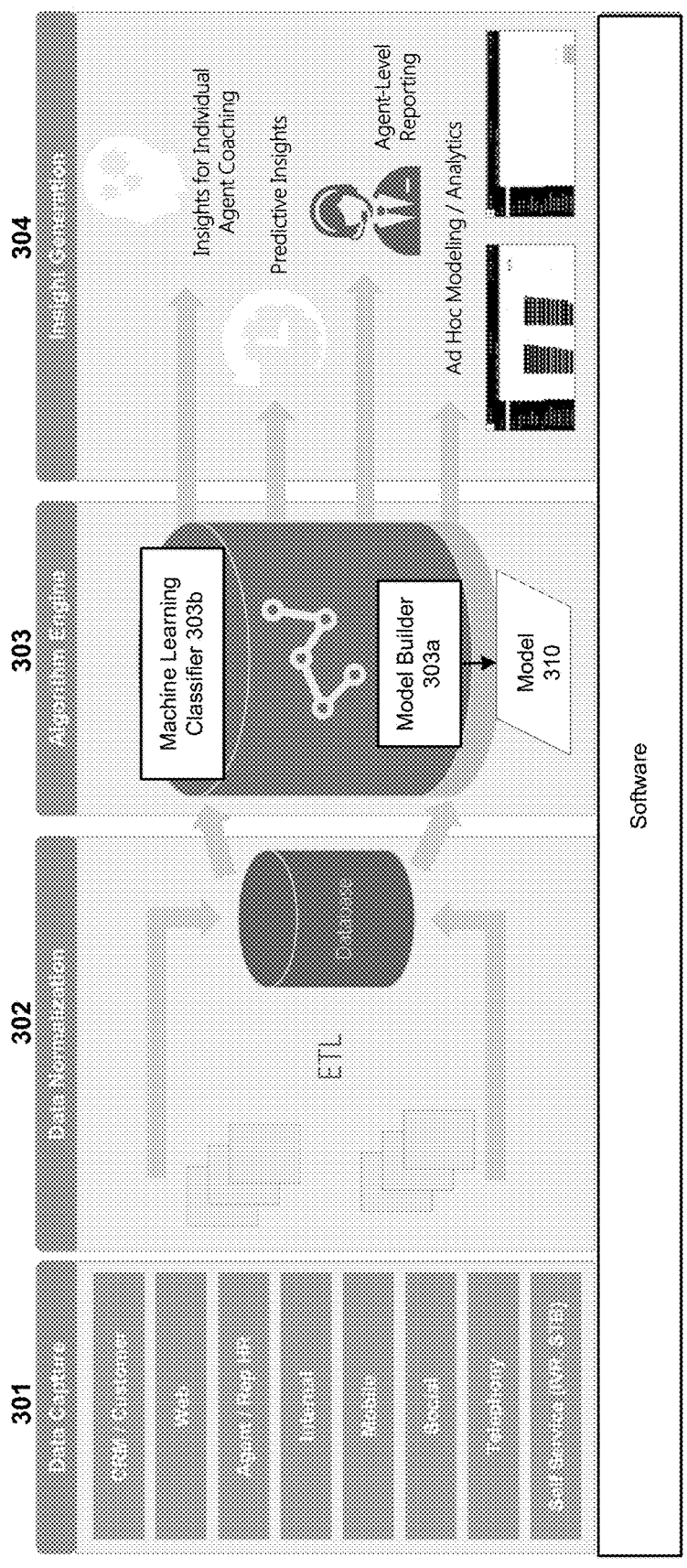
FIG. 3 shows a functional block diagram, according to an example of the present disclosure.

FIG. 3 shows a functional block diagram illustrating operations that may be performed by the system 100. At 301, for data capture, data required for input is captured from the various source systems, shown as data sources 101 in FIG. 1. Examples of metrics captured from the data sources 101 may include customer satisfaction scores of companies or organizations (CSAT), Customer Feedback, Customer Incidents Resolved, Customer Sentiment, Customer Loyalty, Product Adoption, amongst others. At 302, for data normalization, scripts and queries are executed to extract and load data, for example, from flat file format into the data warehouse 115 shown in FIG. 1, which may include relevant database tables, such as AZURE Structured Query Language (SQL) database tables. These tables may include structured tables that help reduce data redundancy and establish the right relationships between the disparate data pieces. The stored data may include the metrics discussed above and other data. The data capture 301 and the data normalization 302 may be performed by the components 104, 106, 108, 110, 112 and 115 shown in FIG. 1.

In an example, data capture at 301 may be performed programmatically through software, e.g., customer relationship management software. At 302, the data may then be normalized through an extract, transform and load process that may include multiple SQL queries executed in a structured SQL database. The metrics are normalized, then, as discussed below, a weighting may be applied to determine a score using either SQL queries or data analysis expressions (DAX), depending on performance requirements. Normalization for metrics that have a set maximum value may be performed. Also, more complex normalization may be performed to incorporate a 'shifting target'. For example, a filter context in PowerBI may be applied. Also, limiting the influence of a single metric may be accomplished through modification of the score, which allows establishing a 'goal' for that metric. This could be applied to as many components as desired, if a set baseline behavior is the goal. In addition, individuals within clearly defined groups can be assigned weightings or values to consider the impact of participation in that group on the overall combined metric. Ultimately, modifying the maximum value for each component before weighting allows tuning the overall score to promote desired behavior.

At 303, the algorithm engine may include a model builder 303a that generates a model 310 for predicting performance. The model may be tuned based on feedback and user input. Also, the algorithm engine may include a machine learning classifier 303b to determine a metric that may be used by the model builder. For example, metrics may be provided from the data sources 101, and/or metrics may be calculated or otherwise determined from the data provided by the data sources 101. An example of a metric determined from the data provided by the data sources 101 is sentiment. The machine learning classifier 303b may be used to predict sentiment from data provided by one or more of the data sources 101.

In an example, measuring sentiment may be performed through natural language processing using multi-class regression using an N-gram approach. Cut-off values are determined for Positive, Negative, and Neutral sentiment and a process tags items with a scored probability below 90% accuracy for manual feedback, paired with a database query that enables timely updates. Also, the machine learning function may learn based on the output of the manual interventions, allowing for it to improve its accuracy over time.

At 304, insight generation may include determining actionable insights based on performance predictions. Also, reports may be generated. The visualization module 122 may include a user interface to display the actionable insights and reports. Also, agent-specific recommendations may be generated for training and improvement. One or more of the operations 301-304 may be performed by software executed by at least one processor, such as described with respect to FIG. 2.

Figure 4A:
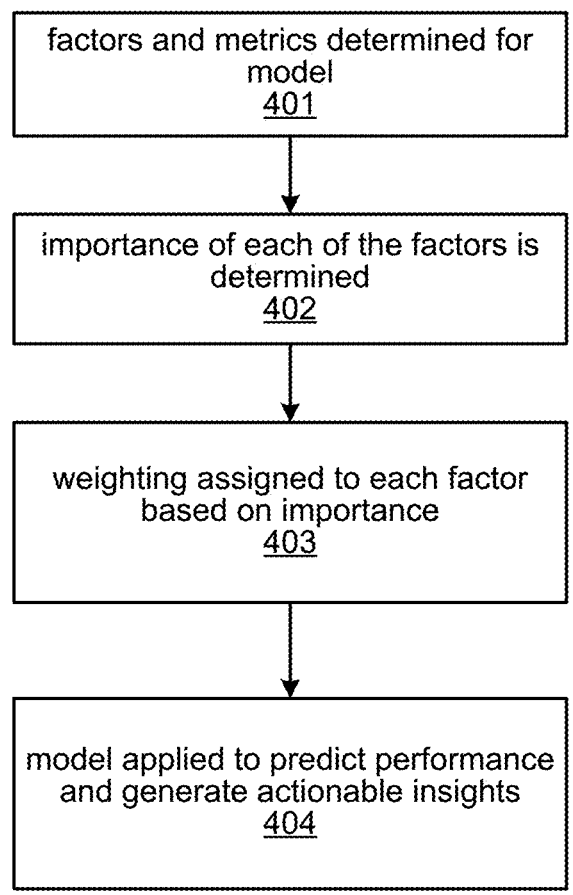
FIG. 4A shows a method, according to an example of the present disclosure.
Figure 4B:
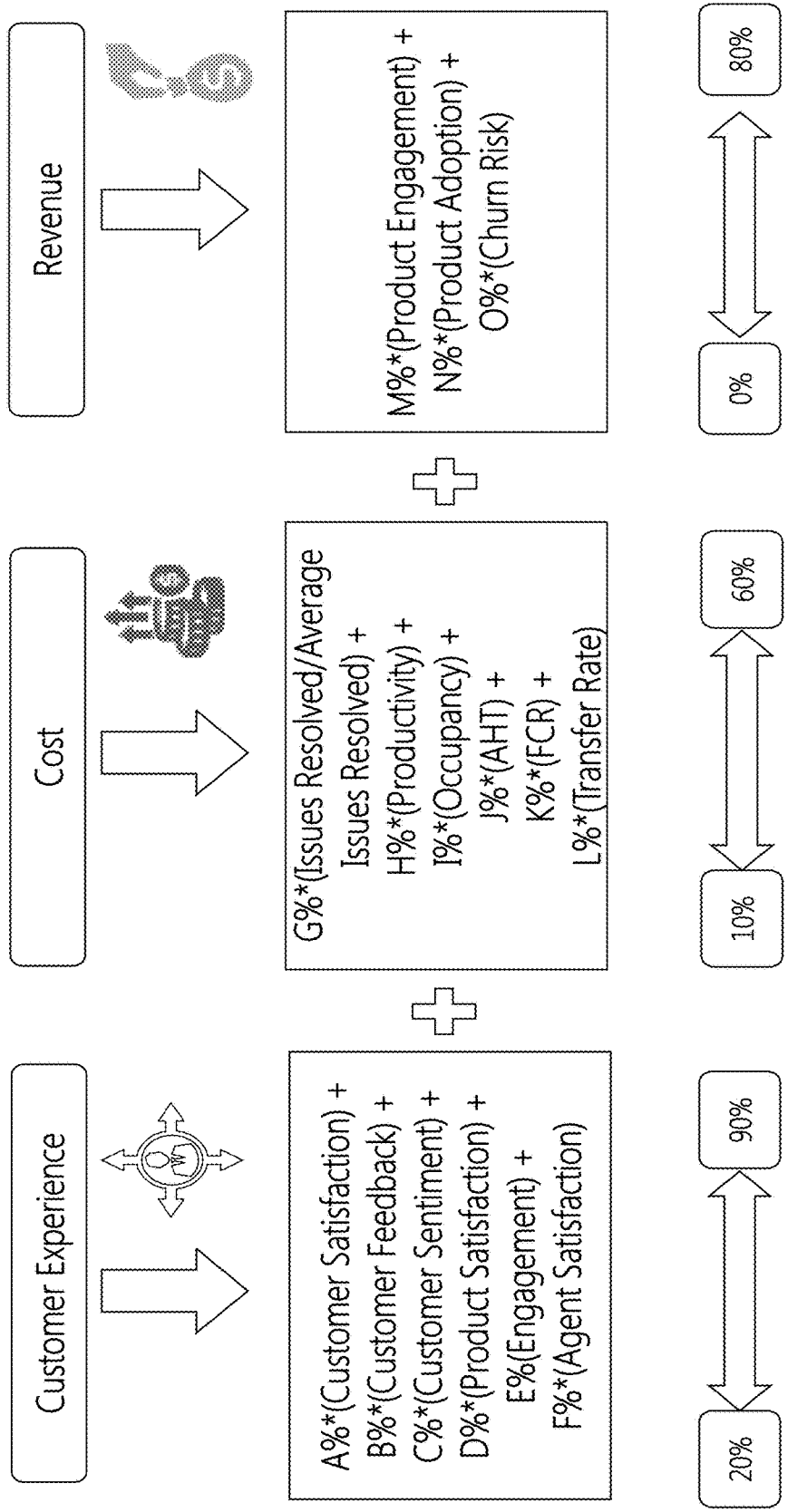
FIG. 4B shows a model, according to an example of the present disclosure.

FIG. 4A shows a method for model building, according to an example of the present disclosure. FIG. 4B shows an example of a tunable model that may be used as the model 310. At 401, shown in FIG. 4A, factors and metrics are determined for the model 310. The factors may include categories of metrics. In an example, the factors may include customer experience, cost and revenue, such as shown in FIG. 4B. Different metrics, also shown in FIG. 4B, may be associated with each factor. For example, metrics under customer experience may include customer satisfaction, customer feedback, customer sentiment, product satisfaction, engagement, and agent satisfaction. Metrics under cost may include issues resolved, average issues resolved, productivity, occupancy, average handle time, first call resolution, and transfer rate. Metrics under revenue may include product engagement, product adoption, and churn risk. Different metrics may be used for different environments. For example, the metrics shown in FIG. 4B and described above may be for a call center environment, and may be used to measure performance of call center agents. In an IT environment, one or more different metrics may be used to measure performance. Examples of categories of metrics and metrics within each category are described above with respect to FIG. 2A. The metrics may be related to web hosting services. The metrics for the IT environment may also include categories for cost and revenue. Revenue may be generated by hosting web sites for customers. Costs may be capital costs for computer resources, operation expenses for operating the data center, and so on.

At 402, the importance of each of the factors is determined. For example, questionnaires are generated to determine the importance of the factors to a particular company or organization, and a particular model is created for that company or organization. The questions may be focused on organizational goals, industry or customer trends, etc.

At 403, a weighting is assigned to each factor and the metrics in each factor based on the determined importance to generate the model 310. FIG. 4B shows that different weightings may be applied to each factor. The weightings for each factor may be within a predetermined range, such as 20%-90% for customer experience, 10%-60% for cost, and 0%-80% for revenue. The weighting may be assigned to the entire group of metrics under each factor. However, the data for the metrics gathered from the data sources 101 or otherwise determined is used to generate the output of the model 310.

Figure 4C:
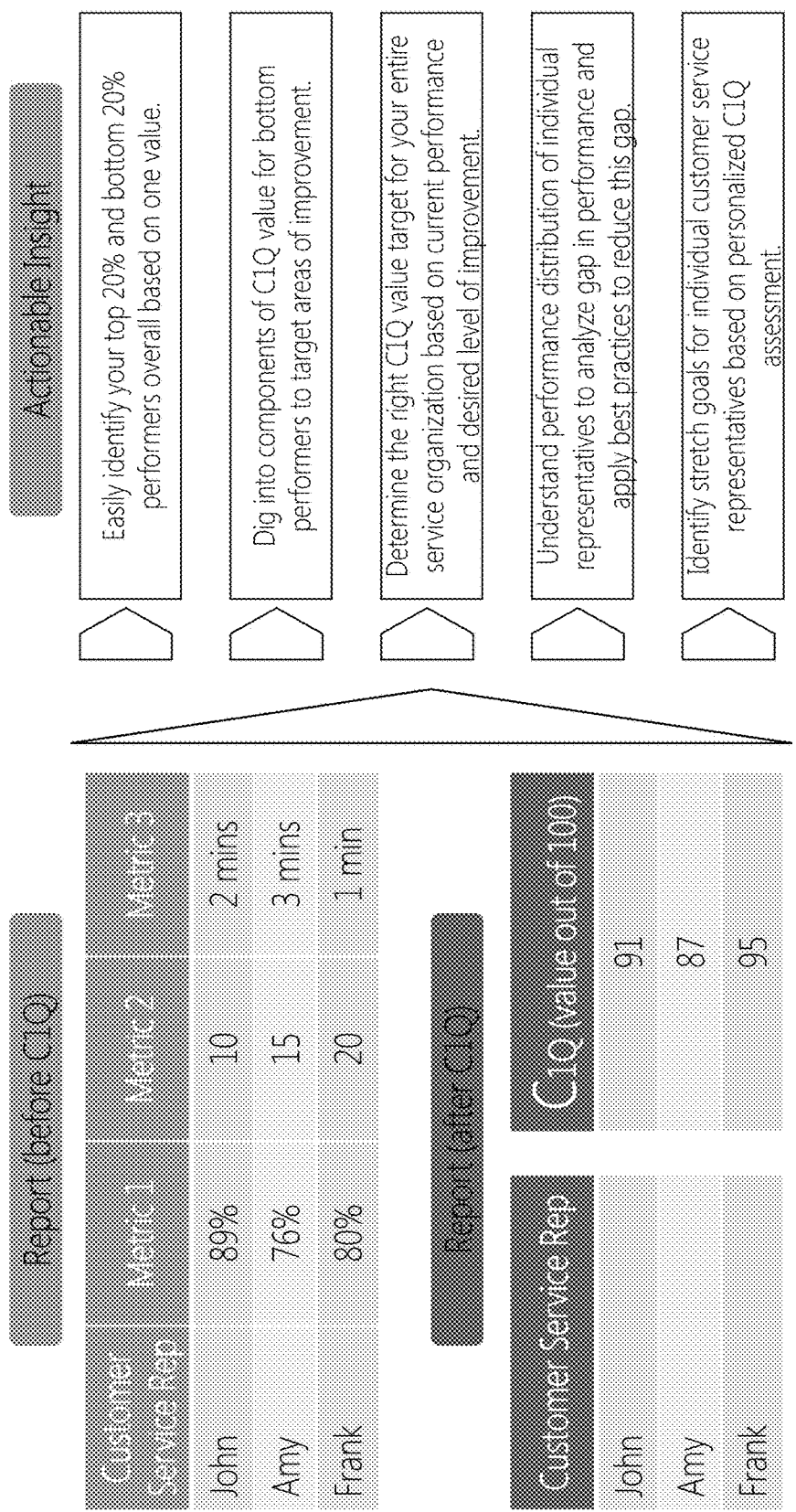
FIG. 4C shows scores and actionable insights, according to an example of the present disclosure.

At 404, the model 310 is applied to data gathered for the metrics to predict performance and generate actionable insights. FIG. 4C shows an example of predicted performance determined for customer service representatives John, Amy and Frank. A subset of the metrics M1-M3 are shown which may be used by the model 310 to calculate the predicted performance. The predicted performance may be a single score for each person, such as 91, 87 and 95 for John, Amy and Frank, respectively. The system 100 may also generate actionable insights based on the scores and the metrics that are used to calculate the scores. Examples of actionable insights are shown in FIG. 4C.

Once the model 310 is built, it may be tuned. For example, weightings may be modified based on user input and based on feedback from external systems or internal systems. For example, weights may be adjusted within the ranges shown in FIG. 4B. Most systems may use a static model for predicting performance. The adjustment of equations for the model 310 may be performed by the system 100 to optimize for the changing goals of the company or organization. For example, initially, the model 310 may be set at 60% for customer satisfaction, 25% for customer feedback, and 15% for cost. If the company or organization decides to focus more on customer satisfaction, then customer satisfaction may be adjusted higher and one or more of the factors may be adjusted lower. Then, performance is predicted more heavily based on customer satisfaction to align with new goals.

The model 310 may be a composite of measured metrics and weights. Each weight may be adjusted to reflect new priorities, such as increasing the weighting associated with customer sentiment to coincide a targeted social media campaign to boost company perception, or to emphasize customer lifetime value based on findings of new research. The system 100 may execute a process to change the weights and adapt the model 310. For example, the system 100 is capable of changing variable weight by observing the frequency and value of incoming transactions and increasing or decreasing the emphasis on particular weights accordingly. A technical support center, for example, may experience a series of poor product satisfaction ratings from its customers. Using this new data, the system 100 adjusts the model 310 to re-prioritize product satisfaction with a higher weighting, aligning management and support staff on this goal. The system 100 may even extend and incorporate new metrics and variables in its calculations as the business continues to answer additional questions that underpin the tool.

Gamification may include the application of typical elements of game playing (e.g., point scoring, competition with others, rules of play, etc.) to other areas of activity. As discussed above, the system 100 may include gamification module 124 to perform gamification operations, which can provide incentives to reach goals for the entities being measured for performance. For example, the gamification module 124 may be programmed to execute competitions and generate visualizations, such as a leader board, based on the competitions and the predicted performance determined by the computation module 114. For call service agents, the gamification module 124 may generate a leader board of the predict performances for the call service agents and implement incentives to reach the top of the leaderboard. Incentives may be generated to improve customer service or other goals.

Figure 5:
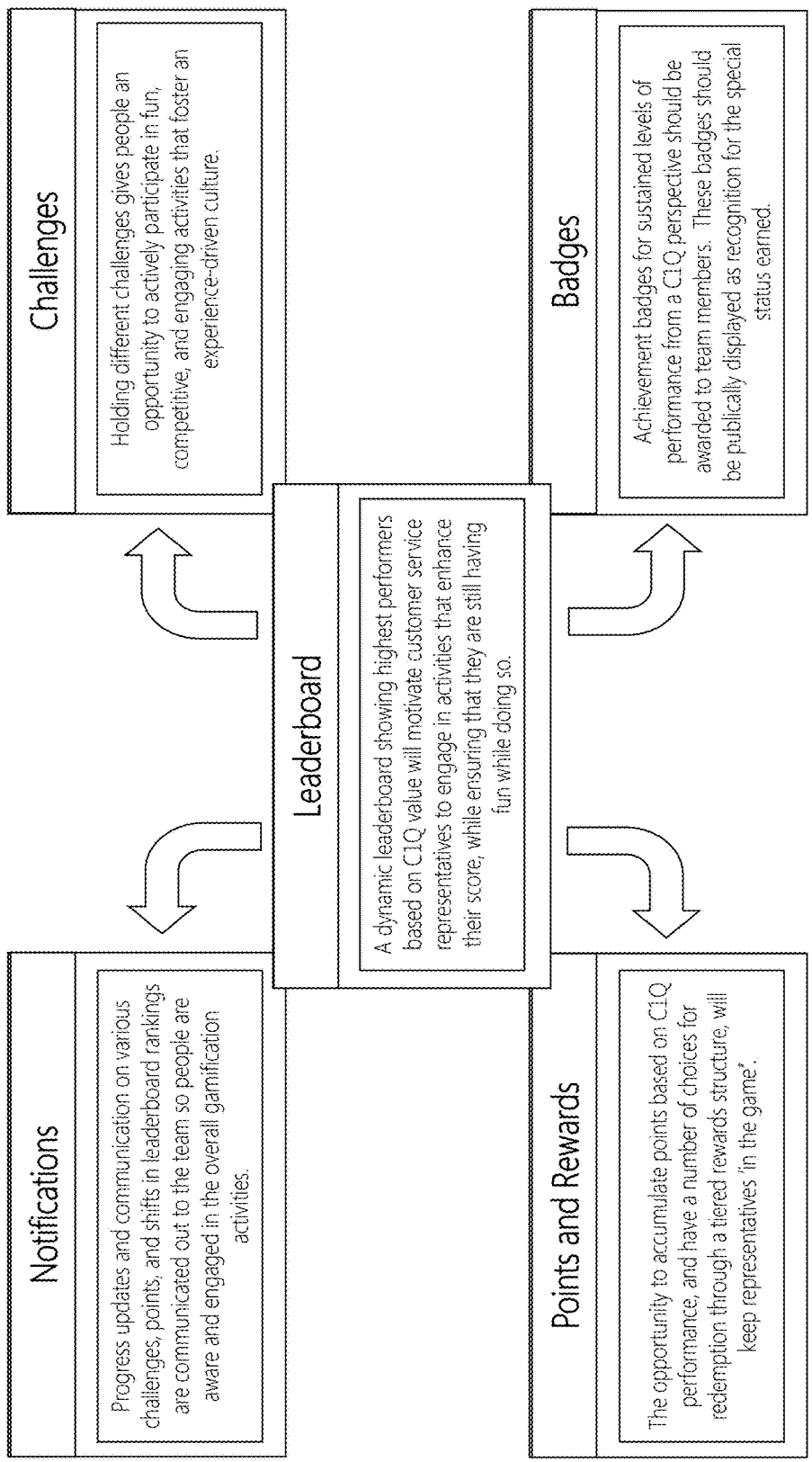
FIG. 5 shows gamification operations, according to an example of the present disclosure.

Examples of gamification operations that may be performed by the gamification module 124 may include notifications, challenges, leaderboard, points and rewards, and badges, such as shown in FIG. 5. Notifications may include progress updates and communication on various challenges, points, shifts in leaderboard rankings, etc. The notifications may be communicated to computers or devices used by the people participating in the challenges or other gamification activities. Also, notifications may be displayed at a central location, such as on a web site, or intranet site, or on a central display device co-located with the people participating in the challenges or other gamification activities. Challenges may include competitions to reach a stated goal. The gamification module 124 may facilitate setting up challenges, including rules for the challenges, and can execute the challenges by monitoring and reporting on competitors' progresses. Holding different challenges may give people an opportunity to actively participate in fun, competitive, and engaging activities that foster an experience-driven culture.

The gamification module 124 may generate a graphical user interface of a dynamic leaderboard showing highest performers based on scores determined by the computation module 114. The leaderboard may motivate customer service representatives to engage in activities that enhance their score, while ensuring that they are still having fun while doing so.

Challenges may be measured or rewarded with points accumulated based on scores. Representatives are provided with the opportunity to accumulate points based on performance, and have a number of choices for redemption through a tiered rewards structure, which may keep representatives 'in the game".

Figure 6A:
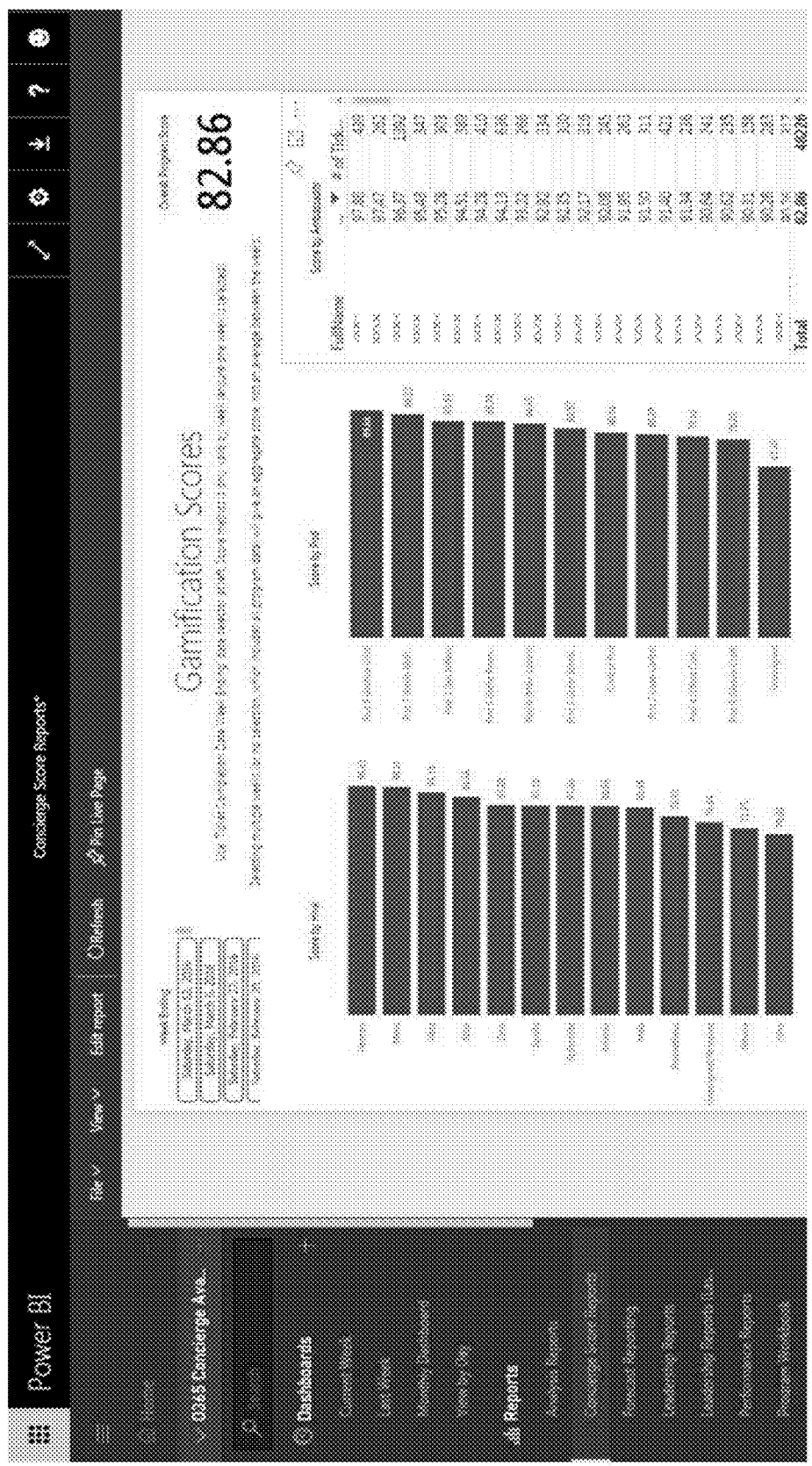
FIGS. 6A-C show screenshots, according to examples of the present disclosure.
Figure 6B:
Figure 6C:
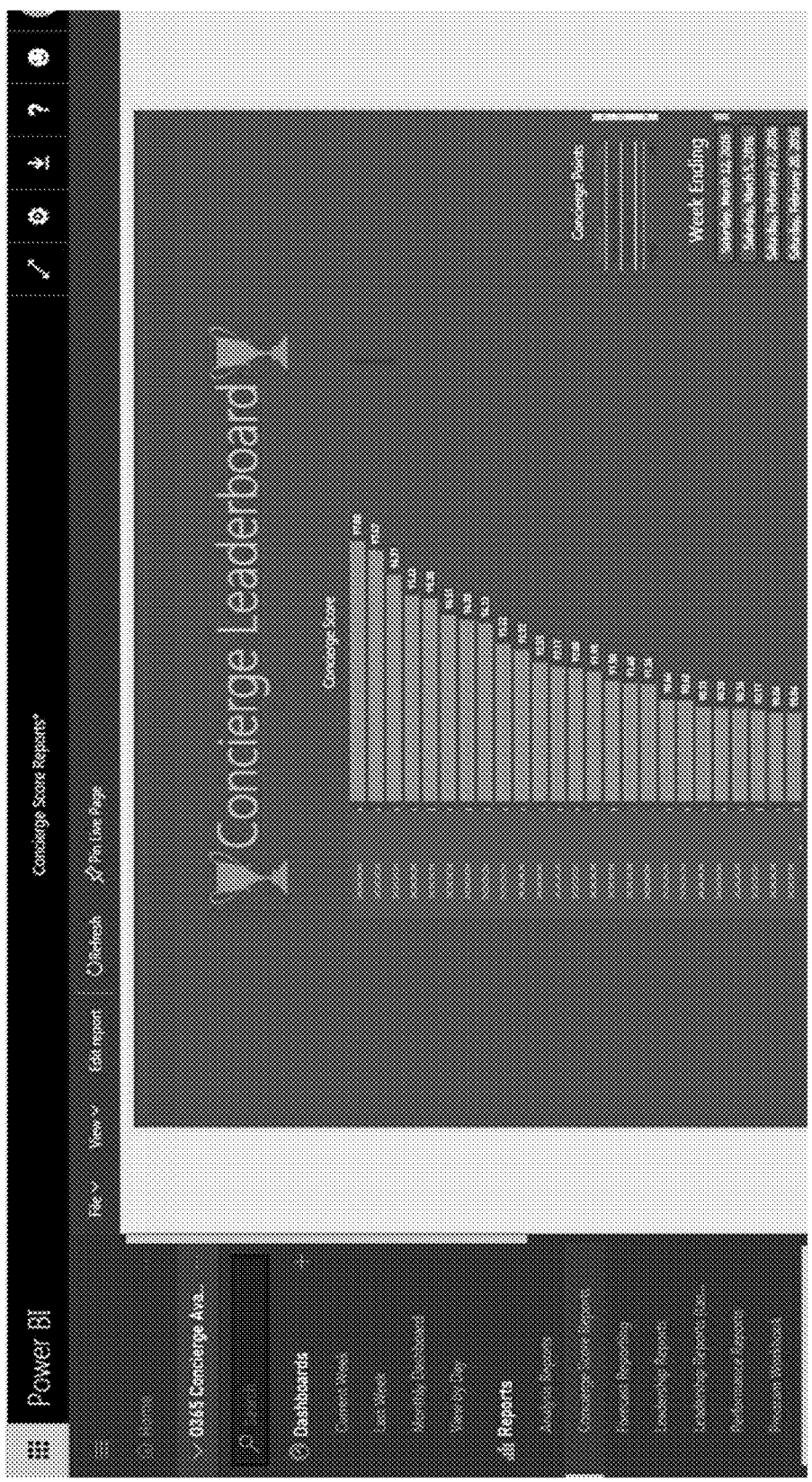

The gamification module 124 may generate achievement badges for sustained levels of performance, and the badges may be publically displayed as recognition for the special status earned. Notifications of earned badges may be sent to all participants FIGS. 6A-C illustrate examples of screenshots generated, for example, by the gamification module 124. The participants for a challenge may be divided into groups, which may include hives and/or pods. FIG. 6A shows an example of displaying scores by group. An overall team score may be shown in addition to individual scores. FIG. 6B shows a screenshot providing details of individuals participating in a challenge. The details may include comparisons to other participants in the group. FIG. 6C shows an example of a leaderboard.

Figure 7:
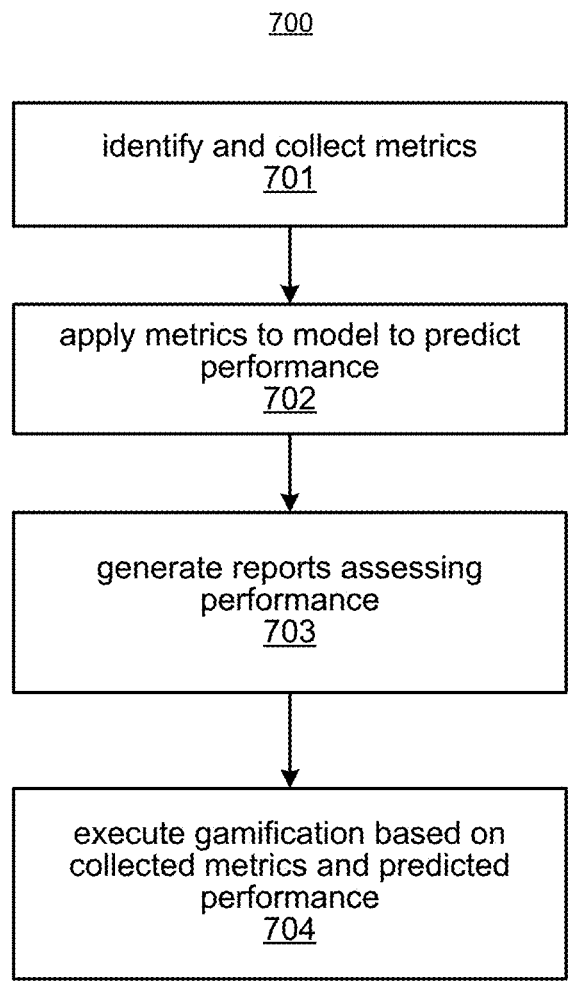
FIG. 7 shows a method, according to an example of the present disclosure.

FIG. 7 illustrates a method 700 that may be performed by the system 100. At 701, metrics are identified and collected, which may include metrics for capturing customer feedback, satisfaction, etc. At 702, the collected metrics are applied to the model 310 to predict performance. In an example, performance may be predicted for each workload or web hosting service (such as for the IT system shown in FIG. 2A), or for each agent, customer representative, etc. (such as shown for the system shown in FIG. 2B). At 703, the model output (e.g., predicted performance) may be used to generate reports assessing performance of teams of agents or sets of computer resources for an IT environment. Performance may be assessed across roles, geographies, work models, etc. At 704, gamification may be executed based on the collected metrics and predicted performance. Gamification may be used to reward individuals and teams to positively reinforce customer-centric behavior.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An information technology system operable to provision computer resources for workloads, the information technology system comprising:
   a configuration and management server to:
      allocate subsets of computer resources from a pool of computer resources to workloads, wherein the workloads comprise web hosting services; and
      capture performance metrics for each subset of computer resources assigned to one of the workloads;
   a performance prediction server to:
      identify performance metrics from the captured performance metrics for a model, the identified performance metrics comprise categories of metrics including metrics approximating end-to-end response time observed by an end user downloading a web page, metrics evaluating caching of web pages, and metrics associated with aborted requests for web pages;
      determine weights for the identified performance metrics;
      generate a model based on the identified performance metrics and the weights; and
      apply the model to the captured performance metrics to predict performance for each of the workloads, wherein the predicted performance is a single score for each workload, and
   wherein the configuration and management server is further to:
      determine the allocation of the subset of computer resources for each of the workloads based on the predicted performance for each of the workloads;
      evaluate each of the categories of metrics when the score falls below a threshold to determine whether a particular category is underperforming;
      when a particular category is underperforming, evaluate individual metrics within the particular category to determine whether the individual metrics are underperforming, and
      based on an underperforming category or an underperforming metric, performing a remedial action to improve the underperforming category or the underperforming metric, including at least one of:
         provisioning additional CPU cycles or additional virtual machines, and
         provisioning additional network switches or network switches that have higher throughput capability.

2. The information technology system of claim 1, wherein the performance metrics measure the performance of the subset of computer resources from a perspective of an end user.

3. The information technology system of claim 1, wherein to generate the model, the performance prediction server is to:
   determine a weighting for each category, wherein the identified performance metrics in each category are weighted according to the determined weighting.

4. The information technology system of claim 3, wherein the category weighting comprises a range of weights and the performance prediction server is to modify the model by selecting a new weight for a plurality of the categories within the range for each category.

5. A system operable to provision computer resources for workloads, the system comprising:
   at least one processor;
   a non-transitory computer readable medium storing machine readable instructions executable by the at least one processor, wherein the machine readable instructions comprise:
   a data import and management module to collect and normalize metrics for each subset of computer resources assigned to one of the workloads, each computer resource including a web hosting service, and store the metrics in a database; and
   a computation module to:
      identify a set of the metrics wherein the identified set of metrics has categories of metrics including one or more of metrics approximating end-to-end response time observed by an end user downloading a web page, metrics evaluating caching of web pages, and metrics associated with aborted requests for web pages,
      determine weights for the set of metrics, and generate a model based on the set of metrics and weights;
      apply the model to the collected metrics to predict performance, wherein the predicted performance includes a single score for each workload;
      adjust at least one of the weights and the set of metrics in the model based on at least one of the collected metrics and user input;
      evaluate each of the categories of metrics when the score falls below a threshold to determine whether a particular category is underperforming;
      when a particular category is underperforming, evaluate individual metrics within the particular category to determine whether the individual metrics are underperforming, and
      based on an underperforming category or an underperforming metric, performing a remedial action to improve the underperforming category or the underperforming metric, including at least one of:
         provisioning additional CPU cycles or additional virtual machines, and
         provisioning additional network switches or network switches that have higher throughput capability.

6. The system of claim 5, wherein the categories of metrics include customer experience, cost and revenue, and the weights are associated with each category.

7. The system of claim 5, wherein the computation module is to determine actionable insights based on the predicted performance.

8. The system of claim 5, wherein the predicted performance is for a customer representative or a computing resource in an information technology infrastructure.

9. The system of claim 5, wherein the machine readable instructions comprise a gamification module to:
   determine a challenge based on predicted performances determined by the model; and
   generate a leader board based on the challenge and the predicted performances.

10. The system of claim 5, wherein the machine readable instructions comprise a machine learning function to predict sentiment based on collected data associated with customer feedback.

11. A system operable to provision computer resources for workloads, the system comprising:
   a server to capture performance metrics for each subset of computer resources assigned to one of the workloads, wherein the workloads comprise web hosting services;
   a performance prediction server to:

identify performance metrics from the captured performance metrics for a model, the identified performance metrics comprise categories of metrics including metrics approximating end-to-end response time observed by an end user downloading a web page, metrics evaluating caching of web pages, and metrics associated with aborted requests for web pages;

determine weights for the identified performance metrics;

generate a model based on the identified performance metrics and the weights; and apply the model to the captured performance metrics to predict performance for each of a plurality of agents, wherein the predicted performance is a single score for each workload, and wherein the server is further to:
determine an allocation of workload for each agent based on the predicted performance for each agent, evaluate each of the categories of metrics when the score falls below a threshold to determine whether a particular category is underperforming;

when a particular category is underperforming, evaluate individual metrics within the particular category to determine whether the individual metrics are underperforming, and based on an underperforming category or an underperforming metric, performing a remedial action to improve the underperforming category or the underperforming metric, including at least one of:
provisioning additional CPU cycles or additional virtual machines, and
provisioning additional network switches or network switches that have higher throughput capability.

12. The system of claim 11, wherein the performance metrics measures performance of the subset of computer resources from customer perspective or an end user perspective.

13. The system of claim 11, wherein to generate the model, the performance prediction server is to:
determine a weighting for each category, wherein the identified metrics in each category are weighted according to the category weighting.

14. The system of claim 13, wherein the category weighting comprises a range of weights and the performance prediction server is to modify the model by selecting a new weight for a plurality of the categories within the range for each category.

15. The system of claim 14, wherein the category weighting is based on customer or end user feedback.

* * * * *